(No Model.)

J. F. McLAUGHLIN.
BATTERY JAR.

No. 492,422. Patented Feb. 28, 1893.

Witnesses:
Percy C. Bowen
F. T. Chapman

Inventor,
James F. McLaughlin,
By Joseph Lyon
Attorney.

UNITED STATES PATENT OFFICE.

JAMES F. McLAUGHLIN, OF PHILADELPHIA, PENNSYLVANIA.

BATTERY-JAR.

SPECIFICATION forming part of Letters Patent No. 492,422, dated February 28, 1893.

Application filed June 2, 1890. Serial No. 353,929. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Battery-Jars, of which the following is a specification.

This invention has reference to improvements in battery jars, being designed more particularly for secondary or storage batteries, and its object is to produce an inexpensive and light jar, that is not at all liable to be injuriously affected by the shocks and rough usage to which secondary batteries are subjected when used on motor-cars or other traveling vehicles.

I construct the improved battery jar of wood, and apply to the interior thereof, an acid proof lining, the composition of which will be hereinafter particularly set forth, as a part of the present invention. The lining composition is of such a nature that it will neither crack nor peel or flake off when the jar is in use, and especially when it is subjected to shocks and jolts, such as it would receive when carried by a traveling vehicle. In addition to this, the wooden jar is provided with metallic corner plates for strengthening the jar, and two of these corner plates are connected with the electrodes, so that the jars may be placed upon a tray provided with metallic contacts for coupling them together in the manner set forth in my patent No. 425,818, granted April 15, 1890, or they may be connected in series by simply placing them side by side with the corner plates of one in contact with the corner plates of the adjoining jars.

In the annexed drawings, forming part of this specification, I have shown a battery jar adapted for containing secondary battery electrodes, but it is to be understood that I am not confined to the use of the improved jar for secondary batteries only, nor am I confined to the exact construction shown, since the same may be variously modified without departing from the principle of the invention.

Figure 1:
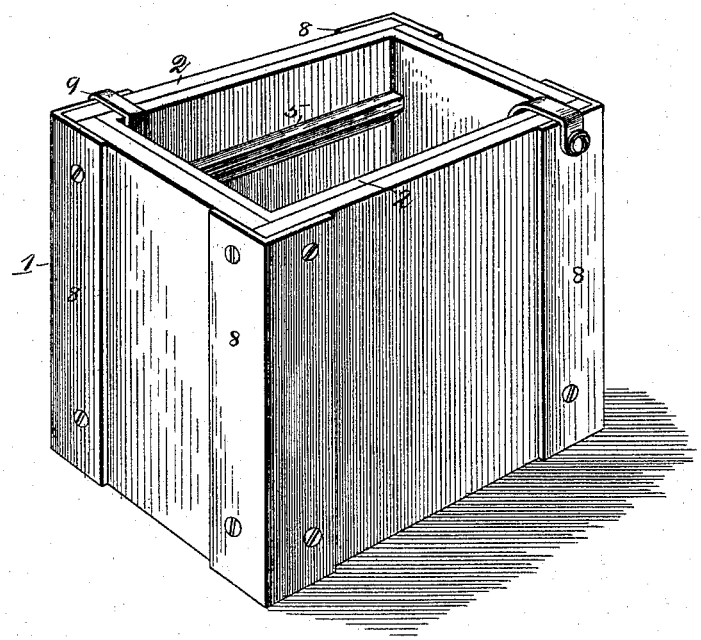
Figure 2:
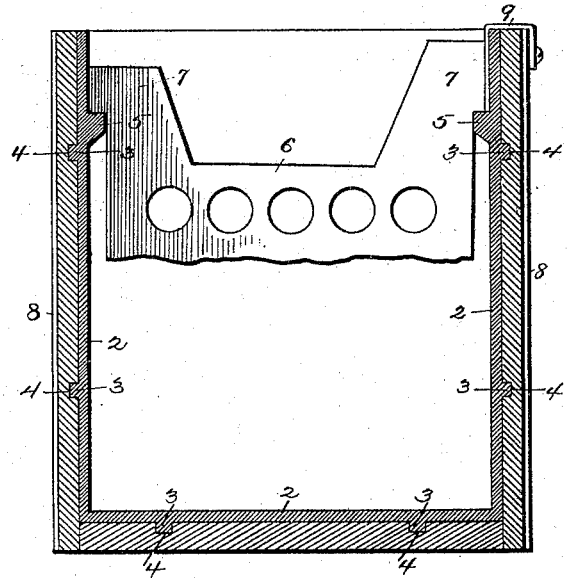

Figure 1, is a perspective view of a battery jar embodying my improvements; and Fig. 2, is a vertical cross-section of the same.

Referring to the drawings, there is shown a rectangular jar 1, the body of which is composed of wood of suitable thickness to give the jar the requisite strength and rigidity, and the ends, sides and bottom of the jar may be secured together in any suitable manner, as, for instance, by screws.

The entire interior surface of the jar is covered by a protective lining 2, of suitable thickness, being held against displacement within the jar by integral flanges or ribs 3, which enter longitudinal grooves 4, in the sides and bottom of the said jar. Formed on and integral with the lining 2, near the upper end and on opposite sides of the jar, are shoulders 5, for supporting the electrodes contained within the jar, which electrodes may be of any desired construction, but I prefer to use the electrodes I have shown and described in my Letters Patent No. 408,666, granted August 6, 1889, and No. 410,007, granted August 27, 1889, and in Fig. 2, I have shown a portion 6, of such an electrode, with its angle arms 7, resting on the shoulders 5.

The protective lining 2, is composed of pitch (preferably Creek pitch), and sulphur, in about equal parts, and in preparing such composition, I first melt the pitch and then add the sulphur, being careful to maintain the temperature at a point at or slightly above the melting point of sulphur, until the latter has become melted and thoroughly mixed with the pitch. I may introduce the composition while liquid, directly into the jar 1, in which case, I employ a plunger of suitable form and construction, which constitutes a core, when inserted in the jar, around which the said composition is cast; or I may form a lining in a suitable mold and then build up the jar around it. The composition, when cold, is hard and tough, and will not crack, or flake or peel off when subjected to jolts or shocks, or when roughly handled; and, the composition being also hygroscopic and acid-proof, it is eminently fitted for use as a lining for wooden jars of either primary or secondary batteries.

In order to strengthen the jars and to facilitate the coupling of a number of battery cells, I face the corners of the jar with metallic corner-pieces 8, extending from the top to the bottom of the said jar and secured thereto by screws, as shown, or otherwise.

To diagonally opposite corner-pieces 8, are secured conducting strips 9, extending to the interior of the jar, where they are connected to the terminals of the positive and negative electrodes, respectively, by solder or otherwise.

It will be observed, that it is only necessary to place the jars with the proper corners in contact, in order to couple them.

Having now fully described my invention, I claim and desire to secure by Letters Patent—

1. A battery jar, consisting of a wooden body, a water-tight, acid-proof, insulated lining for the same, and metallic corner pieces for the wooden body, substantially as described.

2. A battery jar, having a wooden body and metallic corner pieces for the said body, constituting terminals for the battery electrodes, substantially as described.

3. A battery jar, consisting of a wooden body, a water-tight, acid-proof lining for the same, and electrode supports composed of ribs formed integral with the said lining, substantially as described.

4. A battery jar, consisting of a wooden body having interior longitudinal grooves and a water-tight, acid-proof lining for the same, provided with locking ribs entering said grooves, substantially as described.

5. A battery jar, consisting of a wooden body having interior longitudinal grooves, and a water-tight, acid-proof lining for the same provided with locking ribs entering said grooves, and other ribs on said lining and forming electrode-supports, substantially as described.

6. A secondary battery, consisting of a jar of wood lined with acid-proof material and provided with exterior metallic corner pieces, and electrodes connected with two of these corner pieces, substantially as described.

In testimony whereof I have signed my name to this specification in the presence of two subscribing witnesses.

JAMES F. McLAUGHLIN.

Witnesses:
HERBERT P. KER,
H. F. REARDON.